Figure 1:
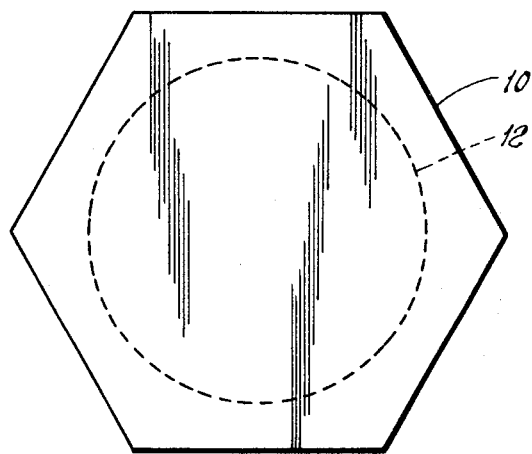

United States Patent

[11] 3,583,349

| [72] | Inventors | William Colletti<br>New York;<br>Louis J. Rebori, Bronx; Frederick J. Vath, Staten Island; George J. Poneros, Brooklyn; Clarence K. Chatten, Jackson Heights, all of, N.Y. |
|------|-----------|---|
| [21] | Appl. No. | 826,998 |
| [22] | Filed | May 22, 1969 |
| [45] | Patented | June 8, 1971 |
| [73] | Assignee | The United States of America as represented by the Secretary of the Navy |

[54] DEEP SEA SUBMERGENCY BUOYANCY MODULE AND METHOD OF MAKING SAME
1 Claim, 5 Drawing Figs.

[52] U.S. Cl. .................................................. 114/16, 220/9
[51] Int. Cl. .................................................. B63g 8/00
[50] Field of Search ........................................ 114/16; 220/9 F; 206/46 FCM; 264/101, 102, 321

[56] References Cited
UNITED STATES PATENTS

| 3,261,317 | 7/1966 | Gignoux .................... | 114/16 |
| 3,436,775 | 4/1969 | Schlosser et al. ............ | 9/8 |
| 3,450,082 | 6/1969 | Demarest .................... | 114/16 |

Primary Examiner—Trygve M. Blix
Attorneys—Louis A. Miller, Louis B. Applebaum and Arthur L. Bowers ABSTRACT: A buoyancy module consisting of a glass spherical shell contained centrally of a body of cured syntactic foam that is free of trapped gas pockets and having the form of a right hexagonal prism whose length is equal to the distance between its opposite sides. The diameter of the glass shell is about 3 inches and the inside diameter and length of the prism is about 4 inches. The module is fabricated by supporting the shell centrally in a mold, filling the mold volume around the shell with spherical hollow glass or plastic granules 10 to 100 microns diameter, evacuating the air from the mold, heating the mold and vacuum impregnating the granules with a resin system, pressurizing the mold, curing by polymerization reaction, removing the casting from the mold and trimming the ends of the casting.

INVENTORS.
WILLIAM COLLETTI
LOUIS J. REBORI
FREDERICK J. VATH
GEORGE J. PONEROS
CLARENCE K. CHATTEN
BY Arthur L. Bowers
AGENT
ATTORNEY INVENTORS.
WILLIAM COLLETTI
LOUIS J. REBORI
FREDERICK J. VATH
GEORGE J. PONEROS
CLARENCE K. CHATTEN BY Arthur L. Bowers
AGENT
Lorn B. Capello
ATTORNEY

DEEP SEA SUBMERGENCY BUOYANCY MODULE AND METHOD OF MAKING SAME

The invention described herein may be manufactured and used by or for the Government of the United States of America for governmental purposes without the payment of any royalties thereon or therefor.

This invention relates to a generally superior method of making buoyancy modules of syntactic foam of optimum filler-to-resin ratio around at least one glass spherical shell to obtain a module of the best combination of high strength, low water absorption, low average density, and low cost.

BACKGROUND OF THE INVENTION

Development effort has been directed to deep submergence search vehicles intended for use in scientific fact gathering, as an in situ laboratory, and also for exploring for mineral deposits, food, and habitation. To enable such vehicle to carry the quantity and weight of sophisticated equipment required to accomplish these tasks, the vehicle must have reliable buoyancy material that can provide an appreciable percentage of net buoyancy else the vehicle size for supporting the payload would be monstrous. Net buoyancy on the order of half the density of sea water is desirable. Gasoline has been used in the most primitive vehicles but is intrinsically hazardous and if the gasoline chamber springs a leak buoyancy is lost. Therefore, efforts have been directed to solid-state buoyancy materials. A number of years ago, the buoyancy material (syntactic foam) was developed; it consists of spherical hollow granules of glass or resin embedded in a resin matrix and as free as possible of gas pockets in the matrix around the granules. Granules for the purpose, 10 to 100 microns diameter are marketed commercially. Likewise, various resins have been developed for syntactic foam having different combinations of cost per pound of net buoyancy, compressive strength, low temperature coefficient, impact strength, bulk modules of compressibility, and water absorption.

Net buoyancy of syntactic foam that is otherwise suitable for deep sea submergence applications is not high enough. There have been efforts to increase buoyancy by including comparatively large diameter hollow elements in the syntactic foam.

SUMMARY OF THE INVENTION

This invention concerns forming a buoyancy module to assemble with other such modules to fill a free-flooding flotation chamber efficiently. For this purpose the module is formed as a hexagonal prism. A spherical glass shell is included centrally in the prism. The spherical shell is supported in an open ended hexagonal mold which is filled with hollow spherical glass granules compacted by vibrating the mold. Then the granules are snugly overlaid with a screen held in place with spring elements and a rubber gasket that snugly engages the mold wall. The atmosphere is evacuated from the mold. The mold is preheated, filled with a preheated resin system, the mold is pressurized, thereby forcing the resin into every space, and then pressure is restored. The resin is cured; the casting is removed from the mold and its ends trimmed.

An object of this invention is to generally improve upon known deep sea submergency buoyancy means.

Figure 2:
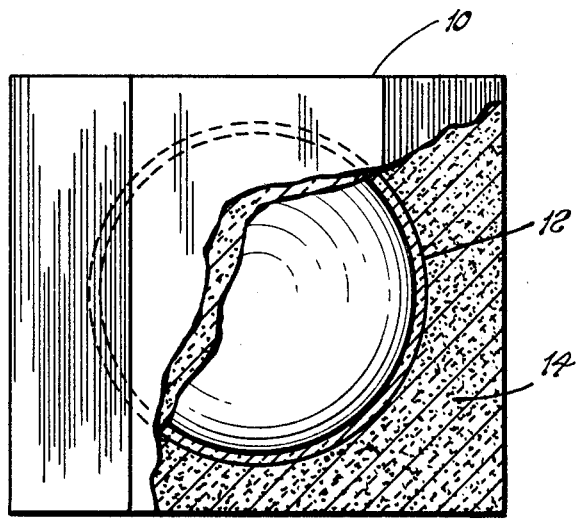
Figure 3:
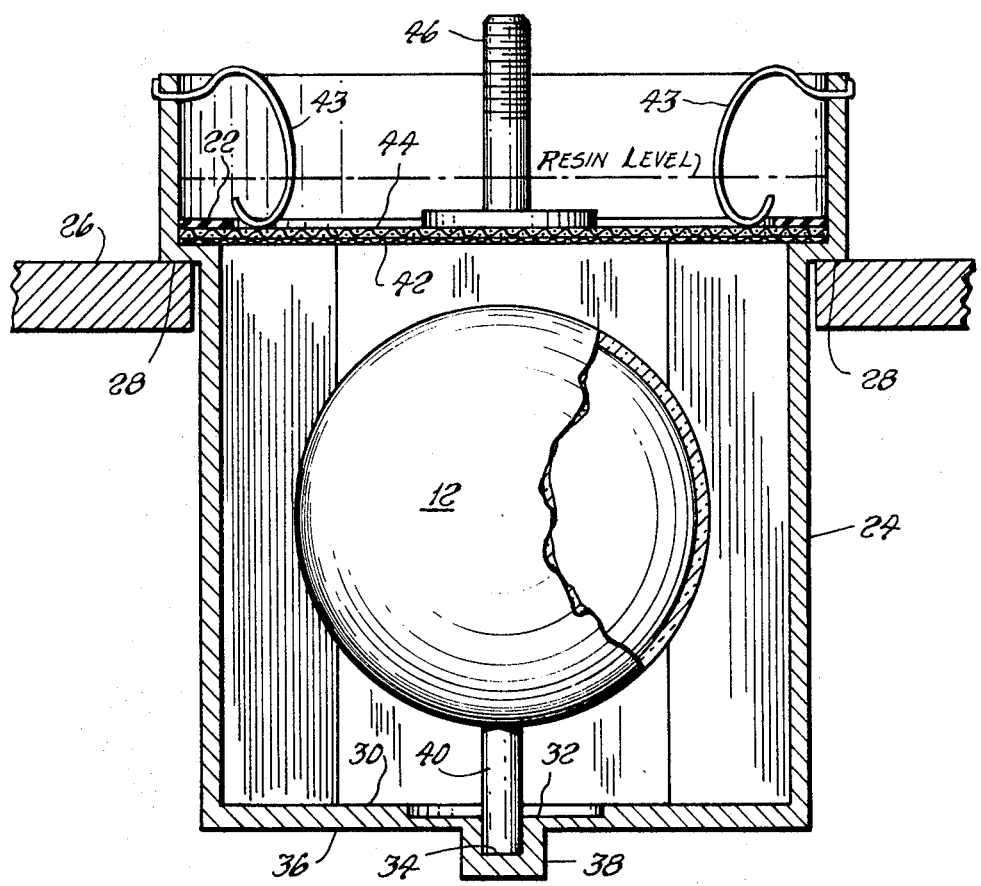
Figure 4:
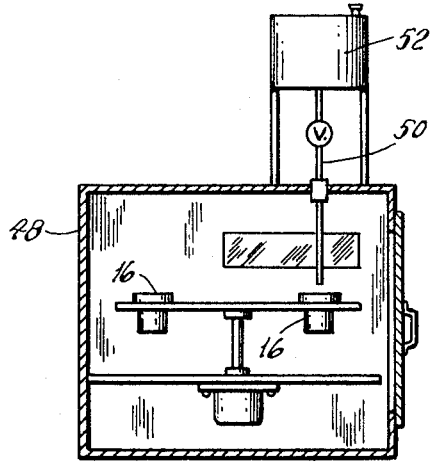
Figure 5:
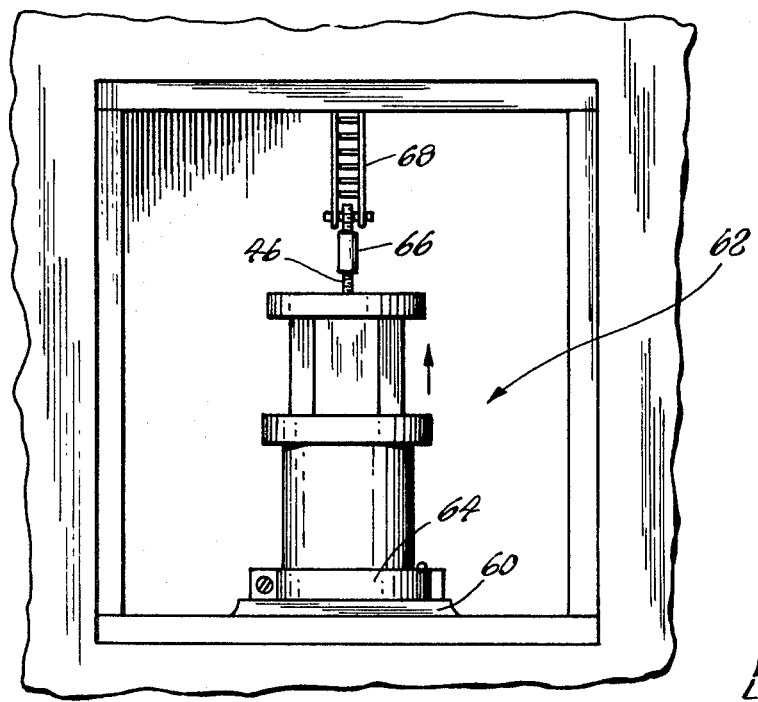

Other objects, advantages, and novel features of the invention will become apparent from the following detailed description of the invention when considered in conjunction with the accompanying drawings wherein:

FIGS. 1 and 2 show a buoyancy module made in accordance with the teachings of this invention, FIG. 3 illustrates a mold with components in place for making a buoyancy module as shown in FIGS. 1 and 2, and FIG. 4 shows a chamber for use in carrying out the process, FIG. 5 shows a tensile machine for withdrawing the casting from the mold.

The buoyancy module 10 shown in FIGS. 1 and 2 is a hexagonal prism wherein the length and the distance between opposite sides are equal. A supply of hexagonal prism modules lend themselves to efficient packing in an irregular shaped chamber of a free-flooding flotation body, not shown. The module 10 includes a thin-walled spherical shell 12 embedded in syntactic foam 14. The specific resin and granules of the syntactic foam are selected from state of the art materials. The shell 12 is central of the module so that the wall thickness of the syntactic foam need not be made larger than necessary for the specific operating conditions anticipated; if the shell were off center, at least one wall is thinner than dictated by design requirements. The spherical shell may be metal but glass is preferable because a glass shell with a particular compressive strength has less weight and is less costly than a metal shell. However, if a glass shell ruptures under high pressure it implodes generating a local shock wave. Under some conditions glass shells in contiguous modules implode in sympathetic reaction to such shock wave. The possibility of a chain of sympathetic implosions in contiguous modules is reduced by optimizing the quality and uniformity of the glass shells and by increasing the wall thickness of syntactic foam 14. However, since the average density of the module is directly related to the quantity of syntactic foam per module, the wall thickness is made no greater than is necessary. As a generalization, the wall thickness of syntactic foam is made approximately one-half inch for good results; more exact specification is related to the specific combination of parameters, including operating depth, glass shell wall thickness, and shell diameter. The glass shells are obtained from glass fabricators. Preferably the glass shells are as spherical as practical with essentially uniform wall thickness. Good results were obtained by using glass shells cast as hemispheres, and bonded to form spheres.

The buoyancy module described is formed in a mold 16 as shown in FIG. 3. The mold has radial symmetry, is integral, open at one end, and formed with sufficient draft to permit withdrawal of a casting molded therein. Alternatively, the mold may be formed of readily frangible material. For a minor fraction 18 of its length at the open end the mold wall is circular terminating in a shoulder 20 to nest a force-fitted elastomeric gasket 22. For essentially all of the remainder 24 of its length; the mold is hexagonal inside and circular outside, but of lesser outside diameter than the outside diameter of the circular cylindrical portion 18. In use, the mold sits in a holder 26 sustained by shoulder 28. The inner face 30 of the closed end is formed with a shallow circular air well 32 and a substantially deeper recess 34 centrally of the shallow well. The outer face 36 of the closed end of the mold may be flat or may be formed thinner to conserve material with a projection 38 for housing the recess 34.

The length of the hexagonal portion of the mold exceeds slightly the distance between opposite sides of the hexagon to provide for trimming the ends of the module whereby its trimmed length will equal the inside diameter of the hexagon.

The inside diameter of the hexagon depends upon the choice of diameter of the shell. The average density decreases as the shell diameter increases but shell diameter is limited by cost, handling problems during module forming steps and the increased possibility of sympathetic implosions if one shell fails. The quantity of syntactic foam per module should be minimal to minimize average density. However, the thickness of syntactic foam between the surface of the spherical shell and the outside of the module must be sufficient to withstand internal stress developed in the molded syntactic foam during curing and to shield the shell against implosion shock. If too thin, the syntactic foam splits at the thin section due to internal stress that developes during curing. Also, if too thin, it does not offer sufficient protection to the encapsulated shell.

In use, the mold interior is coated with a release agent to facilitate removal of the casting and then is seated upright in a support 26. A stem 40 of the same syntactic foam as subsequently surrounds the spherical shell is used to locate the shell centrally in the mold. Stem 40 is cemented to the shell and is nested in the recess in the closed end of the mold. The length of the stem is such as to locate the center of the spherical shell axially at the approximate longitudinal center of the hexagonal mold portion 24. Then sufficient filler granules are poured into the mold to fill the hexagonal mold portion. The mold is subjected to vibration to compact the granules. If needed, more granules are added to raise the level of the vibration compacted granules until approximately even with the open end of the hexagonal portion 24 of the mold. The top of granule-filled hexagonal mold portion is covered with a fine-mesh glass cloth 42 backed by stiff metal screen 44 and retained in place by several open loop spring elements 43 and by an elastomeric ring 22 of a diameter to force fit in the open end of the mold. The mesh prevents the granules from floating in the resin.

After the preparatory steps described, the mold is placed in a chamber 48 equipped for evacuation, pressurization, heating, and liquid resin feed through valve controlled delivery tube 50 into the mold 16 from a resin reservoir 52 exterior of the chamber, and with a view port 54 to enable filling the mold to the level shown in broken lines in FIG. 3. The chamber temperature is raised to preheat chamber and mold evenly to about 160° F. The resin system is mixed and preheated to the same temperature, about 160° F. Then the chamber is essentially evacuated and the valve for controlling flow of resin from the reservoir is opened and is closed when the level of resin is in the upper portion of the mold. The vacuum is released and the chamber is pressurized to about twice atmospheric pressure forcing the resin into the interstices. Residual air in the mold after evacuation is forced ahead of the screen-spread inflowing resin and in large part collects in the air well. The resin portion that deposits in the air well is comparatively crumbly after curing. If the well is absent there are crumbly pockets at the inner end of the casting.

The mold is removed from the chamber, a bolt 58 is placed in the resin, head seated on the screen. Then the mold is placed in an oven to cure at about 200° F. for about 3 hours.

When the resin is cured, the mold is removed from the oven, placed on the platform 60 of a tensile machine 62, and gripped by clamps 64. A coupling 66 joins the bolt 46 to tensioning member 68. The mold may be damaged or fractured in the effort to free the casting. The metal of the mold is reused.

The mold is formed of commercially marketed eutectic metal which has a melting point below 300° F. The damaged or broken molds are melted and recast simply and inexpensively. Large numbers of the modules can be made by mounting a group of the molds on a turntable arrangement in the chamber 48 and then transferred as a group to an oven.

When oven-cured, the castings are removed from the molds and saw-trimmed at both ends removing the well portion and the upper portion which includes the screens, bolt, etc. The trimmed casting is post-cured at a temperature too high for the eutectic metal, approximately 350° F. for 4 hours.

To pack a space with the modules, groups are belted together to facilitate handling and minimize shifting.

We claim:

1. A buoyancy module comprising:
  a glass spherical shell,
  integral continuous void-free syntactic foam surrounding the spherical shell and in intimate contact with the shell over the entire outer surface of the shell and having the geometric configuration of a hexagonal prism with squared, ends, wherein the inside diameter of the hexagonal prism and the length of the prism are equal, and
  the center of the spherical shell and the center of the hexagonal cylinder being essentially coincident.